Nov. 17, 1942.  G. L. HEFT  2,302,371
APPARATUS FOR FORMING AND HANDLING PRINTS OF BUTTER AND THE LIKE
Filed May 31, 1938  5 Sheets—Sheet 3
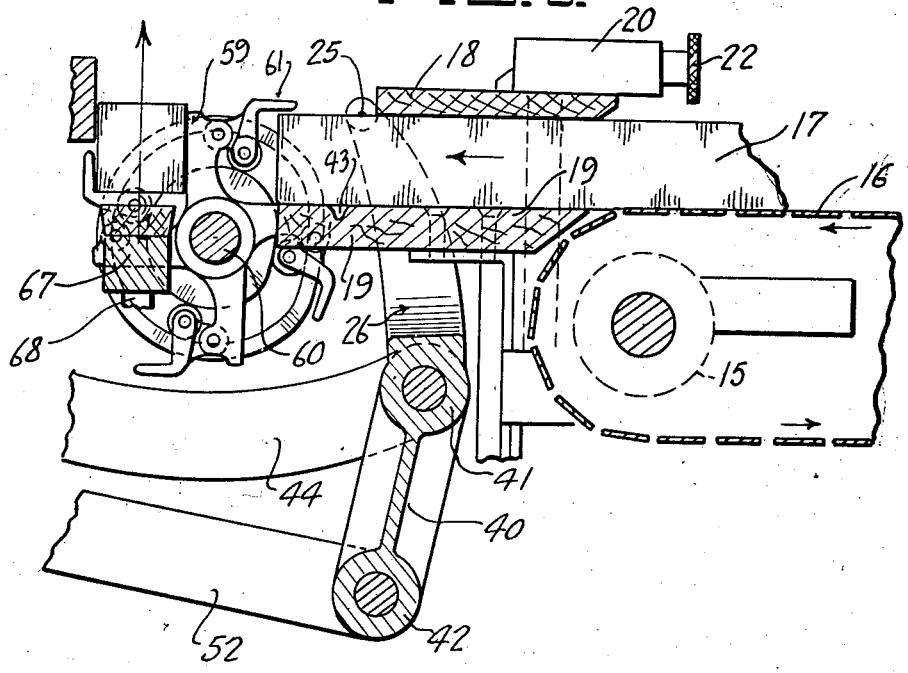
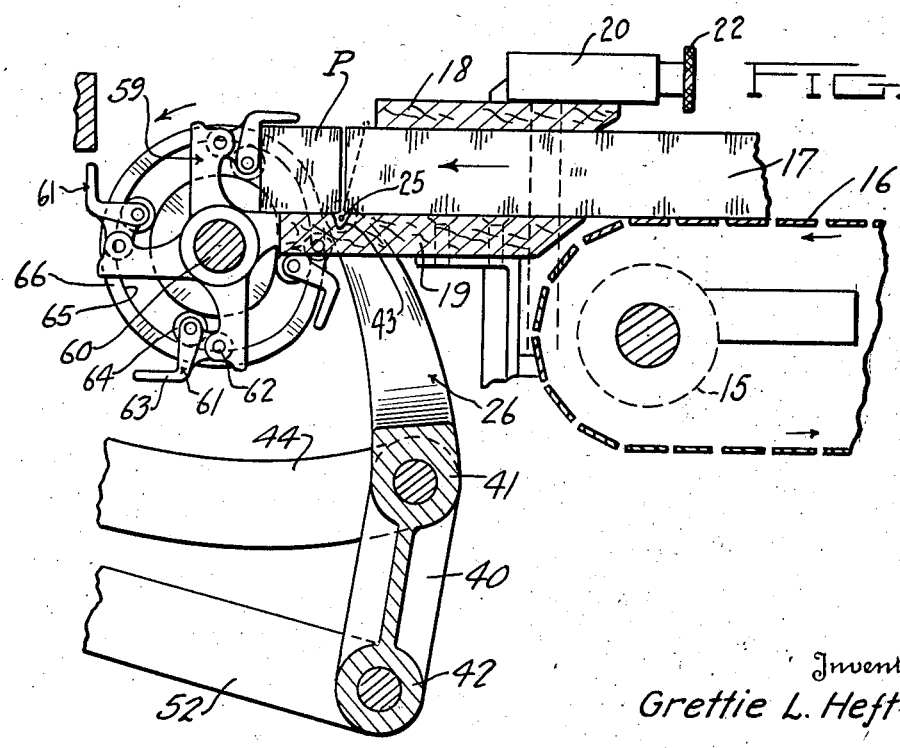
Inventor
Grettie L. Heft
By
Attorney Nov. 17, 1942.  G. L. HEFT  2,302,371
APPARATUS FOR FORMING AND HANDLING PRINTS OF BUTTER AND THE LIKE
Filed May 31, 1938  5 Sheets-Sheet 4
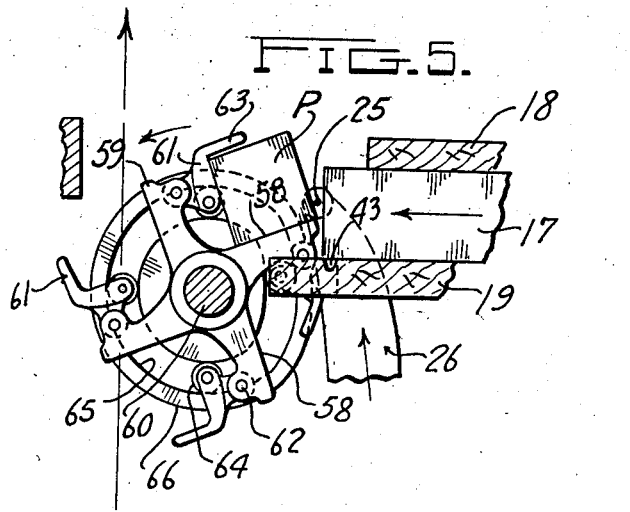
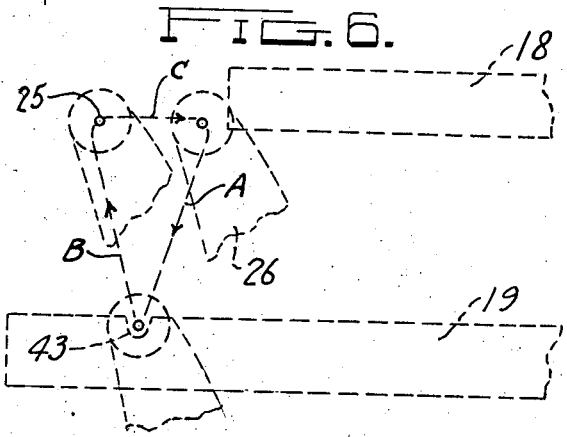
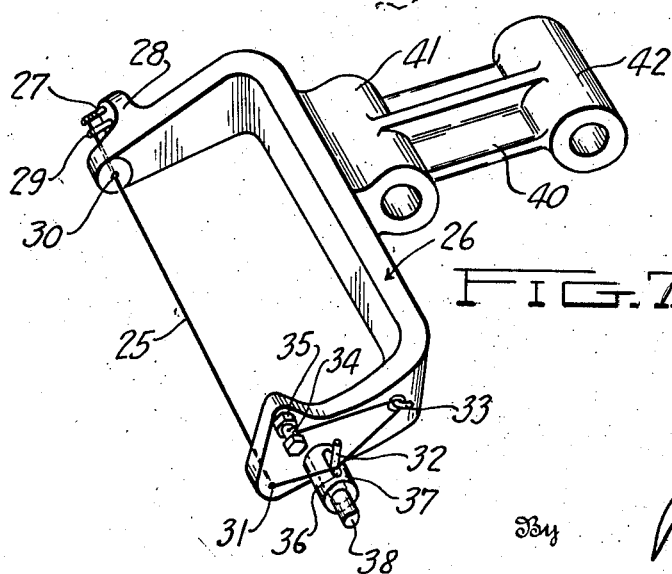
Inventor
Grettie L. Heft
By
Attorney

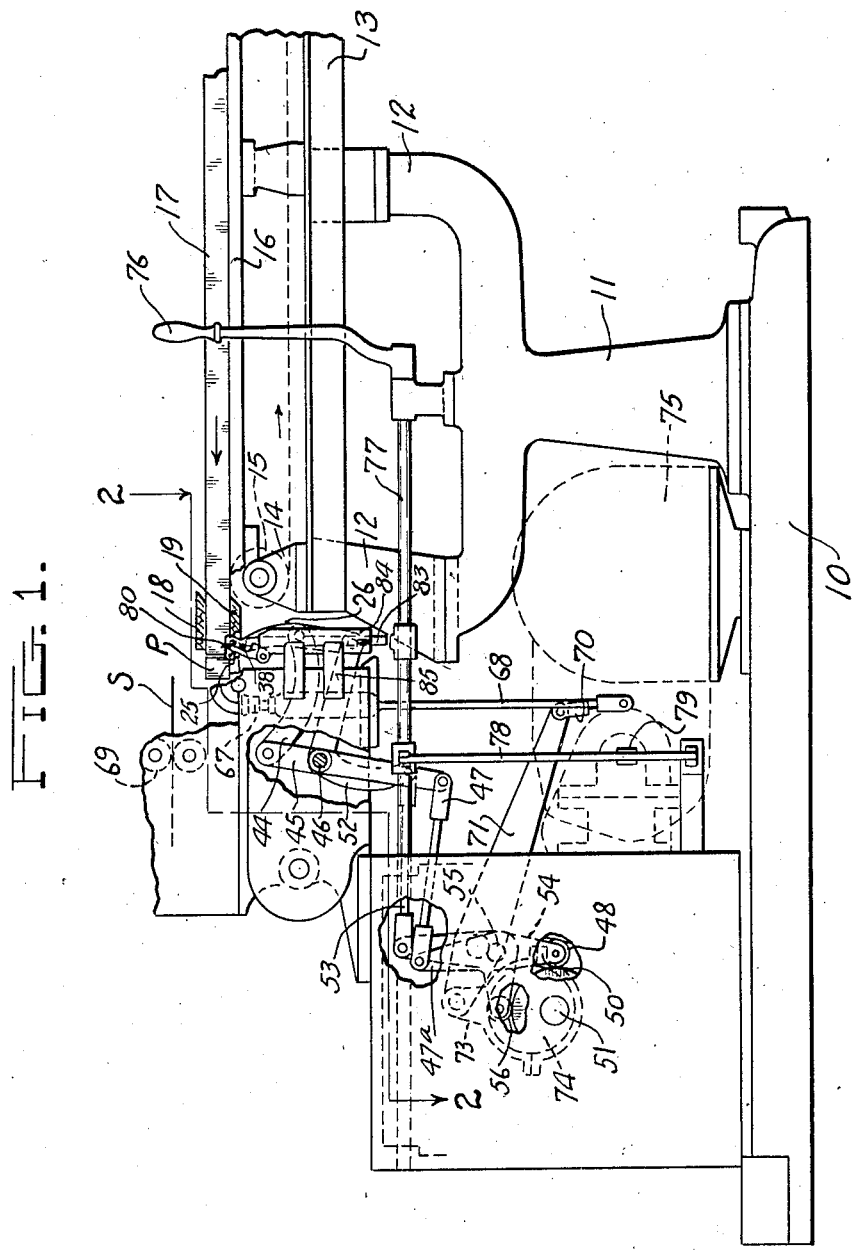

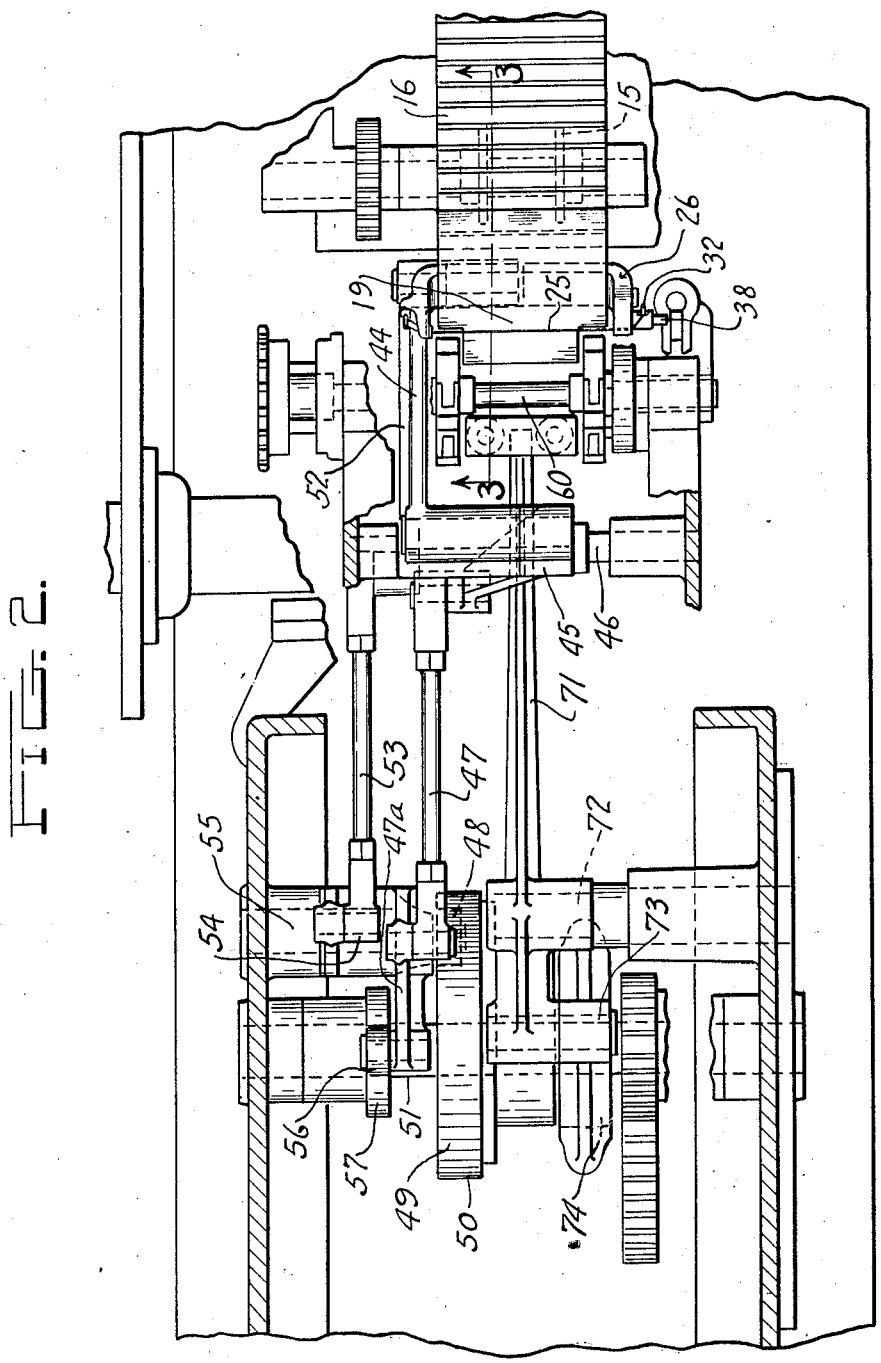

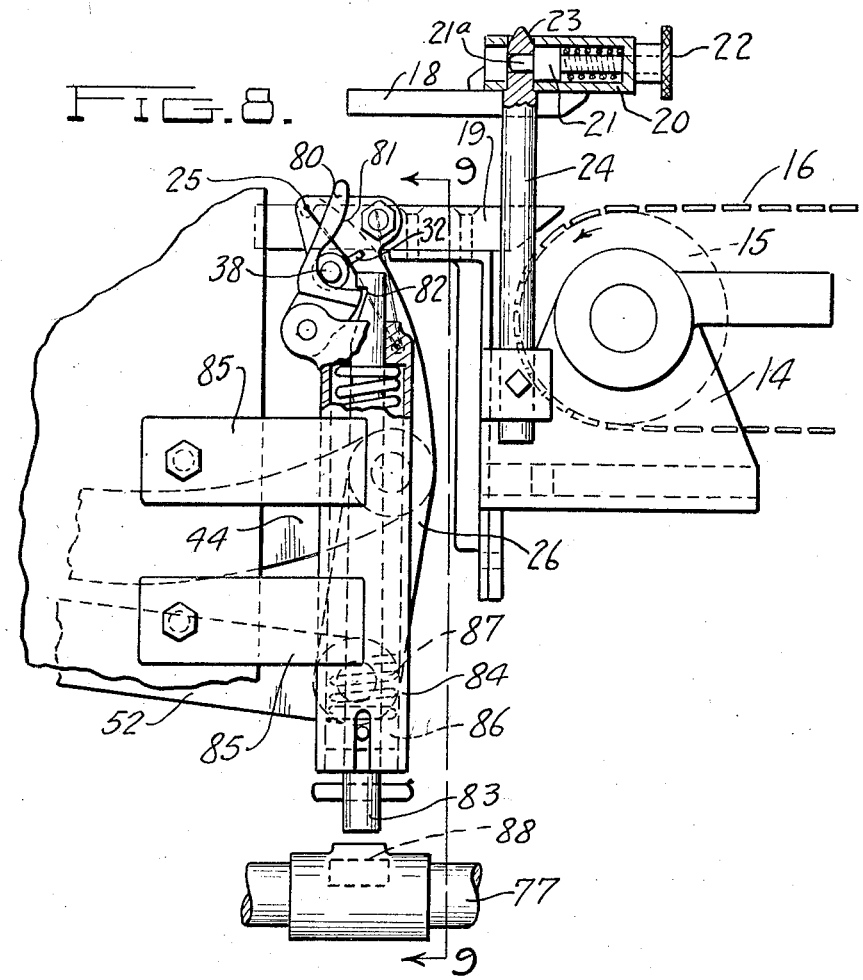
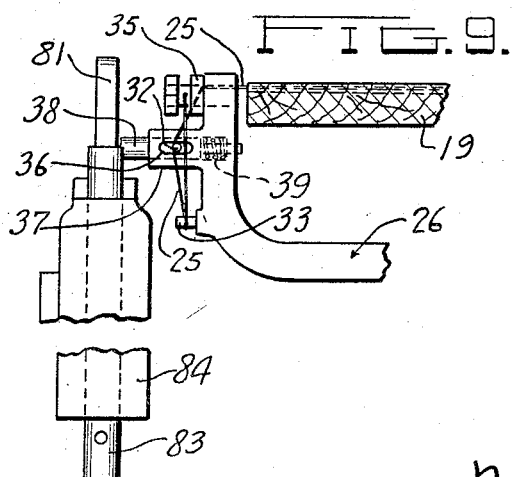

Patented Nov. 17, 1942

2,302,371

UNITED STATES PATENT OFFICE 2,302,371

APPARATUS FOR FORMING AND HANDLING PRINTS OF BUTTER AND THE LIKE

Grettie L. Heft, Toledo, Ohio, assignor to Lynch Manufacturing Corporation, a corporation of Ohio Application May 31, 1938, Serial No. 210,936

6 Claims. (Cl. 31—20)

This invention relates to wrapping and packaging machines for material of a plastic or semi-plastic nature such as butter, oleomargarine, lard and the like, but more particularly to the cutting or severing of prints or bars from a continuous slab and the handling of such prints or bars preparatory to wrapping with relatively flexible sheet material such as parchment paper.

An object of this invention is to produce a simple and efficient apparatus for severing or cutting bars or prints from a continuously advancing slab of material such as butter, but which severing is accomplished by a cutting instrument disposed parallel to the contiguous surface of the slab, which passes progressively through the slab during the advancing movement of the latter and then retracts into position to effect the next succeeding severing operation.

Another object is to produce a new and improved apparatus of the above character in which the severed prints are positively engaged and shifted in an arcuate path preparatory to being advanced to the sheet wrapping mechanism.

A further object is to provide, in a severing mechanism of the above character, an automatic device operable upon breakage or damage to the severing instrument to render the slab advancing means inoperative.

Other objects and advantages of the invention will hereinafter appear, and for purposes of illustration but not of limitation, an embodiment of the invention is shown on the accompanying drawings, in which Figure 1 is a side elevation of a portion of a machine for advancing a continuous slab of butter or the like, for severing the slab recurrently into bars or prints of predetermined size and actuating the severed prints to a position preparatory to being advanced by plunger means to wrapping mechanism, the latter being omitted;

Figure 2 is an enlarged sectional view substantially on the line 2—2 of Figure 1;

Figure 3 is a vertical sectional elevation on the line 3—3 of Figure 2 showing the cutting wire in position just at the beginning of the cutting operation;

Figure 4 is a view similar to Figure 3 showing the position of the parts after cutting or severing has been accomplished;

Figure 5 is a detail sectional view showing the position of the parts after the cutting wire has partially retracted and showing the manner in which severed bars or prints are positively shifted away from the advancing slab;

Figure 6 is a diagrammatic view showing the path of movement of the cutting wire;

Figure 7 is an enlarged perspective view of the cutting wire supporting bracket;

Figure 8 is a detail view in elevation partly in section showing the trigger controlled spring tensioned rod for stopping the slab feeding in the event of breakage or damage to the cutting wire; and Figure 9 is a vertical sectional view substantially on the line 9—9 of Figure 8.

The illustrated embodiment of the invention comprises a base or bed 10 on which is mounted a standard 11 having upright arms 12 supporting a horizontal beam 13. On the beam 13 is a bracket 14 carrying a sheave 15 about which an endless belt 16 is guided. Another sheave (not shown) suitably driven, also receives the belt 16. The belt 16 is preferably made up of a series of metal slats disposed transversely of the belt so that material such as butter, oleomargarine, lard or the like will not adhere to it. It will be understood that an elongate slab 17 of material, such as butter, is placed on the upper run of the belt 16, which operates continuously for advancing the slab to the left of Figure 1. The slab 17 is preformed and is rectangular in cross section. Since the driving of the belt 16 forms no part of the present invention, detail description and illustration thereof are not considered necessary. Suffice it to say that the belt continuously advances the slab 17 to the left of Figure 1 toward the cutting wire, as will hereinafter appear.

At the forward end of the belt 16 is a housing having an upper wall 18 and a bottom wall 19 which extends a slight distance beyond the upper wall 18. The walls 18 and 19 are spaced apart a distance just sufficient to allow the slab 17 to pass therebetween. As shown in Figure 8, a tubular housing 20 is fixed to the upper side of the upper wall 18 and disposed within the housing 20 is a spring pressed plunger 21 having a handle 22 accessible from the outside. The plunger 21 has a reduced end 21a adapted to engage in a transverse opening 23 formed in the upright post 24 suitably secured to the machine frame. This enables the upper wall or plate 18 to be removed as desired and affords a convenient support therefor.

During the continuous advancing movement of the slab 17, a cutting wire 25 recurrently operates to cut prints or sections from the slab, such prints or sections being of a predetermined size such as one-quarter or one-half pound bars.

For that purpose, the operation of the cutting wire and advancing movement of the slab 17 are so timed as to produce prints of the desired size. The cutting wire 25 is carried by a U-shaped bracket 26. One end of the wire is secured to a post 27 projecting outwardly from a post 28. The wire then passes about a guide pin 29 and thence through a transverse aperture 30 in one arm of the bracket 26; thence across to the opposite arm, where it passes through an opening 31. The wire then extends about a pin 32; thence about a hook 33 to a post 34 which can be adjusted for regulating the tension of the wire, a lock nut 35 securing the post in position. The pin 32 operates in a slot 36 formed in a laterally extending tubular housing 37. The pin 32 is fixed to and extends at substantially right angles to a plunger 38 which is urged outwardly from the housing 37 by a coil spring 39 (Figure 9). Thus it will be seen that in the event that the cutting wire 25 breaks, the pin 32 will be released to enable the plunger 38 to be forced outwardly of the housing 37 by the spring 39. As will hereinafter appear, when the plunger 38 is released, the feeding movement of the slab belt 16 is discontinued. Rigid with the cutter bracket 26 is an arm 40 having a boss 41 adjacent the bracket and a boss 42 at the outer end of the arm. As will hereinafter appear, links and levers are connected respectively to these bosses for actuating the cutter.

The arms of the U-shaped cutter bracket 26 are disposed on opposite sides of the lower wall 19 of the slab housing, and, as shown on Figure 6, the cutting wire, which is disposed parallel to the upper surface of the slab 17, moves downwardly and forwardly, as indicated by the line A, to a notch 43 formed in the upper surface of the lower wall 19. Thereupon, the cutting wire retracts upwardly and forwardly, as indicated by the dotted line B, until it reaches a point above the slab 17, and then the cutting wire moves rearwardly, as indicated by the dotted line C, to its original position. This triangular path of movement of the cutting wire is of importance because the angle of the line A is so chosen with relation to the advancing movement of the slab 17 that the wire forms a square cut at the end of the slab, since the point at which it passes from the slab into the notch 23 will be then directly opposite to the point at which the wire initially engaged the upper surface of the slab. It is, therefore, apparent that the angle at which the cutting wire travels to effect the cutting operation must be carefully chosen with relation to the rate of speed with which the slab advances.

To effect such movement of the cutting wire, a curved link 44 is pivotally connected at one end to the boss 41 and at its opposite end to the short arm of a lever 45 which is pivoted at 46. Pivotally connected to the opposite end of the long arm of the lever 45 is a rod 47, which has its opposite end pivoted to a bell crank 47a, which in turn pivots on a post 55. The bell crank 47a carries a roller 56, which rides over a cam 57 mounted on a driving shaft 51. Pivotally connected to one end of the boss 42 is a bell crank 52, which is likewise pivoted intermediate its ends at 46, and has its opposite end pivotally connected to a rod 53, the opposite end of which is pivoted to a lever 54 which is pivoted on the post 55 and has a roller 48 at its opposite end riding in a cam 50. The cam 50 is secured to the shaft 51 for rotation therewith. From the above description it will be understood that the link 44 by means of the cam 50 imparts longitudinal movements to the cutting wire 25 and the bell crank 52 imparts the vertical movements to the cutting wire, these movements being so timed and related to effect movement of the cutting wire through the triangular path substantially, as shown on Figure 6.

As shown on Figure 4, after severance of the slab 17 has been accomplished, the severed section or print P has its forward end disposed beyond the end of the lower wall or support 19 and the end portions of the print at each side of the support 19 rest respectively on shelves 58 formed on spiders 59, two spiders being employed spaced laterally from each other and each being mounted on a shaft 60, which is driven in any suitable step by step manner and being suitably indexed in timed relation to the movement of the cutting wire, so that after cutting operation has been accomplished, the shaft is given a quarter turn. Since the mechanism for actuating the shaft forms no part of the present invention, and since any suitable or well-known drive may be employed for this purpose, detail description and illustration is not considered necessary.

Each spider 59 is provided with four shelves 58 arranged in equidistantly spaced relation and on the outer end portion of each of the shelves 58 is an arm 61 pivoted at 62 to the underside. Each arm 61 has a finger 63. On the inner end of each arm 61 is a roller 64, which rides in a cam groove 65 formed in a cam disc 66. The cam disc 66 is held stationary so that, as the spiders 59 rotate, the cam groove 65 is so fashioned that, as soon as the print P is disposed upon one of the shelves 58, the finger of the preceding shelf 58 is caused to swing in a clockwise direction (Figure 4), thereby positively to engage the upper surface of the print. Thus, when the spiders are indexed, the print P, which has just been severed from the slab 17, is positively engaged at the upper and lower surface. This insures that the prints are retained in the desired position during the revolving movements thereof. Figure 5 shows the manner in which the prints are carried by the spiders after the cutting operation has been accomplished. It will also be apparent that by moving the print in this manner, sufficient space is formed to enable the cutting wire to retract along the dotted line B indicated in Figure 6, it being understood that the slab 17 continues its advancing movement. The cam groove 65 is such as to cause each of the fingers 63 to swing inwardly, as shown in Figure 5, so as not to interfere with the cutting wire 25 and associated parts when moving upwardly.

The print P is then carried by the spiders 59 to the position shown in Figure 3, whereupon the head or ram 67 having a vertically disposed rod 68 moves upwardly to advance the print P to the wrapping mechanism (not shown). As shown on Figure 1, a wrapping sheet S is advanced by a pair of feed rolls 69 into the path of movement of the ram 67. The mechanism for wrapping the sheet about the print forms no part of the present invention, so that detail illustration and description are not considered necessary. The lower end of the rod 68 is connected by a link 70 to an actuating arm 71 which, as shown on Figure 2, is pivotally mounted on a shaft 72 and is connected to an eccentric housing 73 enclosing an eccentric cam 74 fixed to the shaft 51. It will be understood that the arm 71 operates in timed relation to the movement of the spiders 59, so that, as soon as the print P has been delivered to the desired position by the spiders, away from the advancing slab 17, the ram 67 moves upwardly, pushing the print through the wrapping sheet S and then into the wrapping mechanism. The ram 67 then retracts and the operation is repeated.

It is not thought necessary to show and describe in detail the driving mechanism for the above described parts, since the same may be accomplished in a number of different ways. Suffice it to say that an electric motor 75 may operate through suitable speed reducing gears, sprockets and chains for driving the main operating shaft 51 as well as the conveyor belt 16 and other parts. For controlling the operation of the motor, a handle 76 is connected to a horizontal shaft 77, which is suitably connected to a vertical rod 78, which controls the driving parts through a clutch generally indicated by the reference numeral 79. Consequently, when the handle 76 is moved in one direction, the operating parts are disconnected from the motor 75, although the latter continues to operate.

As above mentioned, in the event that the cutting wire 25 breaks, which, as above described, allows the plunger 38 to be forced outwardly by the coil spring 39 (Figure 9), the operating mechanism is disconnected from the motor 75. As shown in Figure 8, the plunger 38, when released, is adapted to engage a trigger 80 having a cam surface 81 with which the plunger engages. Normally the trigger 80, which is of L-shape, engages in a notch 82 of a plunger 83, which is carried by a tubular housing 84, the latter being suitably connected to the machine frame by brackets 85. The trigger 80 is pivoted to the housing 84 and is held against movement to release the plunger 83 by the plunger 38. Within the casing 84 is a head 86 on the plunger 83 and a coil spring 87 bears at one end against the head 86 and at the opposite end against an end of the casing. The lower end of the plunger 83 is adapted to engage an arm 88, which is fixed to the horizontal shaft 77, the force of the spring 87 being sufficient to rotate the shaft 77 and thereby operate the rod 78 to disconnect the clutch 79 from the motor 75. This mechanism militates against the slab 17 being fed forwardly without the cutting wire 25 operating to sever sections therefrom and thus eliminates the danger of damage to the machine.

It is to be understood that numerous changes in details of construction, arrangement and operation may be effected without departing from the spirit of the invention especially as defined in the appended claims.

What is claimed is:

1. Apparatus of the character described comprising means for continuously advancing a slab of butter or the like, a cutter operable recurrently to cut sections from said slab during advancing movement, said cutter comprising a cutting wire, and means operable upon breakage of said wire for stopping the advancing movement of the slab.

2. Apparatus of the character described comprising means for continuously advancing a slab of butter or the like, a cutter operable recurrently to cut sections from said slab during advancing movement, said cutter comprising a cutting wire, and means operable upon breakage of said wire for stopping the advancing movement of the slab, said last means comprising a spring tensioned plunger, a trigger engageable by said plunger and a spring tensioned rod controlled by said trigger, and means operated by said rod for disconnecting the slab advancing means.

3. An apparatus of the character described having means for conveying and continuously advancing a slab of butter or the like, cutting means including a cutting wire, means to horizontally support the slab during cutting which is located forwardly of and spaced from the advancing means, means for positively actuating the cutting means independent of the conveying means for causing the wire to first move from a point above the slab downwardly and forwardly and completely through the slab, thence upwardly and forwardly and finally rearwardly to its starting point or original position, whereby the wire has a triangular movement, and means to time the movement of the slab and the said downwardly and forwardly, and upwardly and forwardly movements of the wire whereby the latter effects a square cut of the slab.

4. An apparatus of the character described having means for conveying and continuously advancing a slab of butter or the like, and cutting means including a cutting wire, a horizontal rigid support for the bottom of the slab spaced from the advancing means and which has a transverse notch in its upper face to receive the wire therein upon completion of the cutting movement of the latter, said wire initially engaging the upper surface of the slab at a point in advance of said notch, means for positively actuating the cutting means independent of the conveying means for causing the wire to first move from a point above the slab downwardly and forwardly and completely through the slab, thence upwardly and forwardly and finally rearwardly to its starting point or original position, whereby the wire has a triangular movement, and means to time the movement of the slab and the said downwardly and forwardly, and upwardly and forwardly movements of the wire whereby the latter effects a square cut of the slab.

5. An apparatus of the character described having means for conveying and continuously advancing a slab of butter or the like, and cutting means including a cutting wire, a casing for receiving the slab therethrough, which casing has its bottom wall spaced forwardly of the advancing means, the upper face of the bottom wall of the casing being formed with a transverse notch to receive the wire upon completion of the cutting movement of the latter, and the top wall of the casing terminating at a point spaced rearwardly of the notch, means for positively actuating the cutting means independent of the conveying means for causing the wire to first move from a point above the slab downwardly and forwardly and completely through the slab, thence upwardly and forwardly and finally rearwardly to its starting point or original position, whereby the wire has a triangular movement, and means to time the movement of the slab and the said downwardly and forwardly, and upwardly and forwardly movements of the wire whereby the latter effects a square cut of the slab.

6. An apparatus of the character described having means for conveying and continuously advancing a slab of butter or the like, and cutting means including a cutting wire, a horizontal rigid support for the bottom of the slab spaced from the advancing means and having a transverse notch in its upper face to receive the wire therein upon completion of the cutting movement of the latter, means for positively actuating the cutting means independent of the conveying means for causing the wire to first move from a point above the slab downwardly and forwardly and completely through the slab, thence upwardly and forwardly and finally rearwardly to its starting point or original position, whereby the wire has a triangular movement, and means to time the movement of the slab and the said downwardly and forwardly, and upwardly and forwardly movements of the wire whereby the latter effects a square cut of the slab.

GRETTIE L. HEFT.